(12) United States Patent
Griffin et al.

(10) Patent No.: US 8,284,544 B2
(45) Date of Patent: Oct. 9, 2012

(54) MOBILE COMMUNICATION DEVICE WITH DISPLACEABLE LID MEMBER

(75) Inventors: Jason Tyler Griffin, Kitchener (CA); Julia Allwright, London (GB); Benjamin Henley, London (GB); Martin Riddiford, London (GB)

(73) Assignee: Research In Motion Limited, Waterloo (CA)

( * ) Notice: Subject to any disclaimer, the term of this patent is extended or adjusted under 35 U.S.C. 154(b) by 219 days.

(21) Appl. No.: 12/713,510

(22) Filed: Feb. 26, 2010

(65) Prior Publication Data

US 2011/0211297 A1   Sep. 1, 2011

(51) Int. Cl.
*H05K 5/00* (2006.01)
*H05K 7/00* (2006.01)
*G09G 5/00* (2006.01)
*H04M 1/00* (2006.01)

(52) U.S. Cl. ......... 361/679.01; 361/679.02; 361/679.55; 361/679.56; 361/679.57; 361/679.58; 345/156; 455/575.1; 455/575.3; 455/575.4

(58) Field of Classification Search ............ 361/679.01, 361/679.02, 679.08, 679.09, 679.3, 679.55–679.59; 345/156, 157, 168, 169, 184; 455/325, 556.1, 455/550.1, 90.1, 575.1
See application file for complete search history.

(56) References Cited

U.S. PATENT DOCUMENTS

| | | | |
|---|---|---|---|
| 5,987,122 A | 11/1999 | Daffara et al. | |
| 2002/0022496 A1 | 2/2002 | Park | |
| 2003/0125081 A1 | 7/2003 | Boesen | |
| 2005/0208984 A1 | 9/2005 | Tang | |
| 2005/0220294 A1 | 10/2005 | Gupte | |
| 2006/0046792 A1 | 3/2006 | Hassemer | |
| 2007/0067954 A1* | 3/2007 | Finney et al. ............ | 16/235 |
| 2008/0232071 A1 | 9/2008 | Schechtel et al. | |
| 2010/0027204 A1* | 2/2010 | Chiang ............ | 361/679.01 |
| 2010/0210326 A1 | 8/2010 | Ladouceur et al. | |

OTHER PUBLICATIONS

Extended European Search Report dated Jun. 23, 2010; EP 10154894.
Print out of http://www.cyberindian.net/2006/07/04motorola-pebl-u6-gsm-mobile-phone/, accessed at least on Sep. 1, 2009.
Print out of http:// www.strawberrycorporation.com/products/all_en.php#p01 including description of "One Touch Open Hinge", accessed at least on Sep. 1, 2009.
Print out of a photograph of Strawberry Corporation One Touch Open Hinge retrieved from http://www.strawberrycorporation.com on Sep. 1, 2009.

* cited by examiner

*Primary Examiner* — Jayprakash N Gandhi
*Assistant Examiner* — Jerry Wu
(74) *Attorney, Agent, or Firm* — Novak Druce + Quigg LLP

(57) ABSTRACT

A mobile communication device, a corresponding connecting mechanism and method are provided. The device comprises a connecting mechanism which rotatably couples a lid member and a base member at a linked end of the device. The connecting mechanism also translationally couples the lid and the base member. When the device is in the closed position, displacing the lid member of the device in the direction of the free end of the device may initiate movement of the device to the opened position.

20 Claims, 10 Drawing Sheets

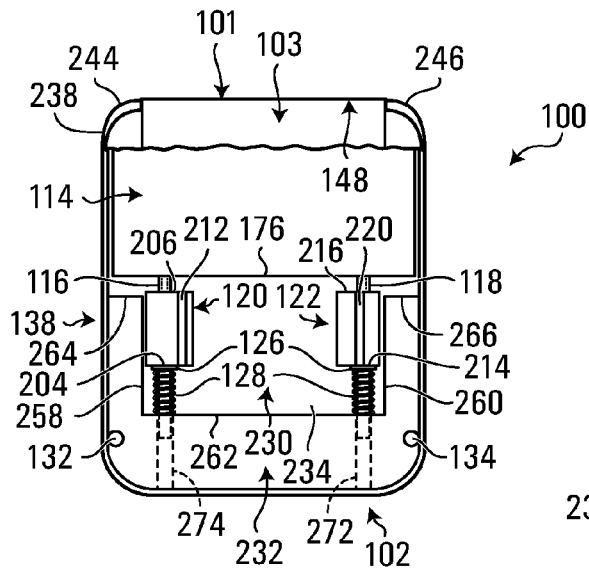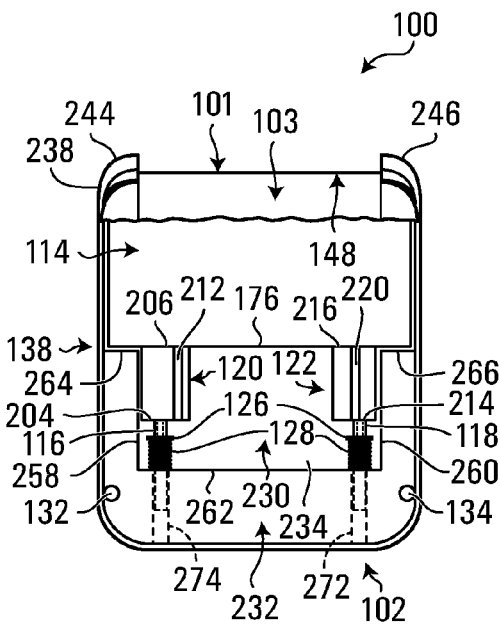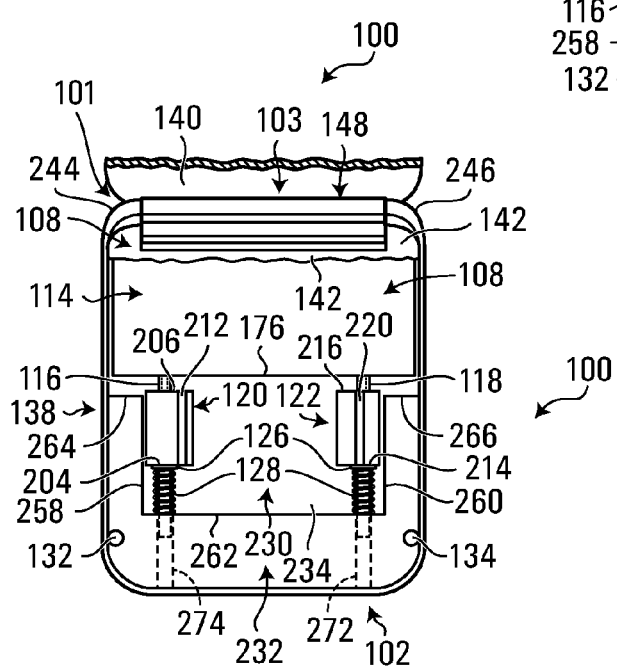

MOBILE COMMUNICATION DEVICE WITH DISPLACEABLE LID MEMBER

FIELD

The application relates to mobile communication devices, and more particularly to mobile communication devices having first and second body members which may be arranged in opened and closed positions.

BACKGROUND

A mobile communication device, such as a "flip phone" or "clamshell" type handheld mobile communication device, may have a linked end and an opposite free end. A flip phone device may include at least a first body member and a second body member which are coupled together at the linked end by a hinge or connecting mechanism such that the device can move between a closed position and an opened position. The first and second body members are commonly referred to as lid and base members respectively.

The lid and base members may commonly include a graphical display and keyboard respectively. The graphical display and keyboard can be on respective inner surfaces of the lid and base members. In the closed position, the inner surfaces of the lid and base members may be adjacent and not accessible to a user of the device. In the opened position, the inner surfaces may be accessible, and the graphical display and keyboard may, therefore, also be accessible to a user of the device.

Typically, a user of a conventional flip phone device must insert a thumb/finger between the two housings of the device to pry it open. Opening a device in this fashion can be difficult for some users to do conveniently while holding the phone in one hand. A user may need to temporarily loosen or release their grip on the device in order to use a thumb or fingers to pry open the device. A poorly gripped device could be dropped causing damage. Some conventional flip phone devices implement push buttons on the phone which initiate opening the device when pushed. Some push button configurations may also require a user to use their thumb and/or to temporarily loosen or release their grip to activate the push button.

BRIEF DESCRIPTION OF THE DRAWINGS

Some embodiments will now be described in greater detail with reference to the accompanying diagrams, in which:

FIG. 7A is a cutaway top view of the mobile communication device of FIG. 1 in a closed position with the lid member and a user interface base cover cut away;

FIG. 7B is a cutaway top view of the mobile communication device of FIG. 1 in a displaced position with the lid member and the user interface base cover cut away;

FIG. 7C is a cutaway top view of the mobile communication device of FIG. 1 in an opened position with the lid member and the user interface base cover cut away;

DETAILED DESCRIPTION

Figure 1:
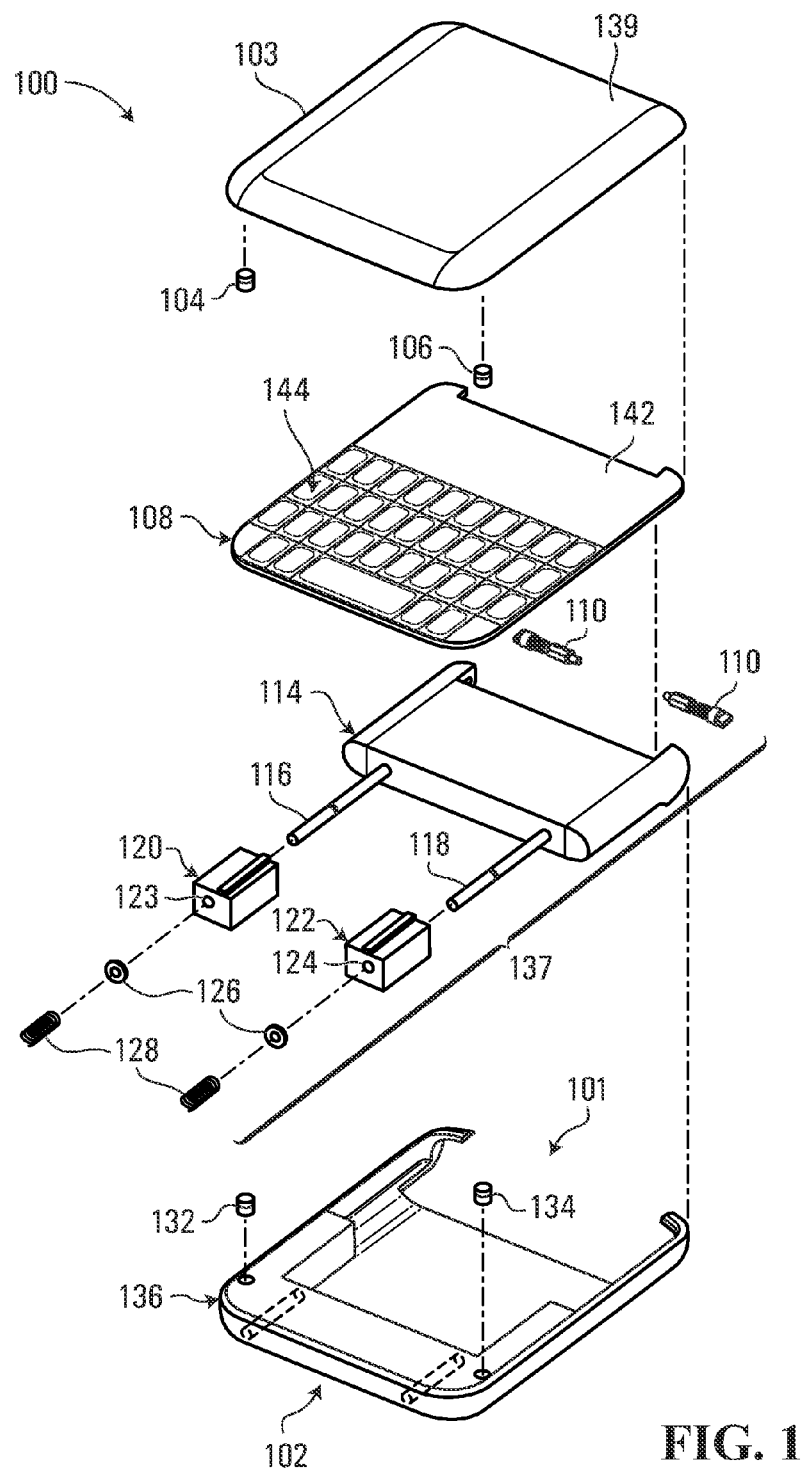
FIG. 1 is an exploded perspective view of a mobile communication device according to a first embodiment.

According to some embodiments, there is provided a mobile communication device having a linked end and a free end, the free end being opposite to the linked end, the device comprising: a first member; a second member; and a connecting mechanism. The connecting mechanism rotatably couples the first member and the second member at the linked end of the device such that the first member and the second member can move between an opened position and a closed position. The connecting mechanism also translationally couples the first member and the second member such that the first member is translationally displaceable with respect to the second member in a direction toward the free end of the device, thereby initiating movement of the device from the closed position to the opened position.

Other aspects and features of the application will become apparent, to those ordinarily skilled in the art, upon review of the following description of the specific embodiments.

This application addresses the difficulty in opening conventional clamshell devices with one hand. Some aspects of the present application provide a mobile communication device including a connecting mechanism that may turn a linked end and a lid member of the device into a virtual push button. The proposed connecting mechanism may provide a single-handed flip phone that the user can easily open simply by pressing forward (i.e. in the direction of a free end of the device) on a linked device end and/or a lid member. A user holding the device in the palm of one hand may be able to simply use an index finger of the same hand to apply force to the lid member at the linked end of the device, thereby opening the device. In this manner, the user may not need to release the thumb of the hand holding the device, and a good grip may be maintained. Essentially, the entire lid member and the linked end of the device may be thought of as a push button.

For simplicity and consistency, inner surfaces of lid and base members are referred to herein as "inner" surfaces even when a device is in an opened position and the inner surfaces are accessible. Surfaces of the lid and base members which are accessible when the device is in both the closed position and the opened position will be referred to herein as "outer" surfaces.

It is to be understood that embodiments are not limited to those having a graphical display and keyboard exclusively on respective lid and base members (or base covers). In some embodiments, keys or a keyboard may also be present on the lid member. Similarly, in some embodiments a graphical display may be located on the base member or in other locations in addition to a graphical display on the lid member. A lid or base member may also have multiple graphical displays with one or more on a surface other than an inner surface in some embodiments. Further, a keyboard may be a virtual keyboard provided on a touch screen display.

It is to be understood that embodiments are not limited to flip phone or handheld mobile communication devices and some embodiments may be directed to other mobile communication devices such as portable computing devices.

A first embodiment of a mobile communication device will now be described with reference to FIGS. 1 to 9C.

Figure 8A:
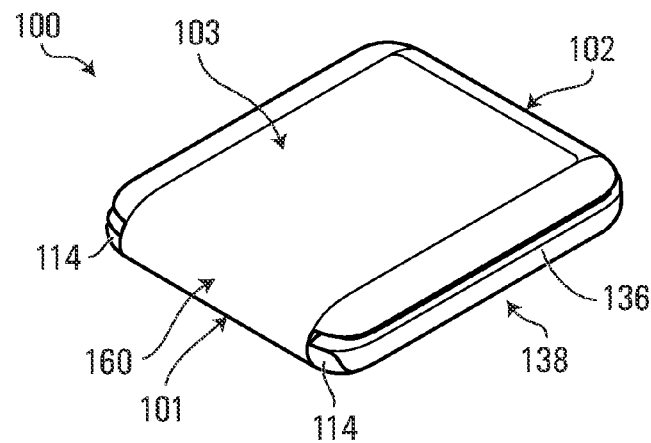
FIG. 8A is a perspective view of the mobile communication device of FIG. 1 in the closed position.

FIG. 1 is an exploded perspective view of a mobile communication device 100 showing elements of the device 100 as oriented when the device 100 is in a closed position (shown in FIG. 8A). The device 100 is only one example of an embodiment in accordance with this application, as will be apparent to one skilled in the art. The device 100 has a linked device end 101 and a free device end 102. The device 100 includes: a first or lid member 103; a first lid magnet 104 and a second lid magnet 106; a user interface base cover 108; two hinge assemblies 110; a slide member 114 having a first rail 116 and a second rail 118; a first base slide guide 120 having a first base slide rail hole 123; a second base slide guide 122 having a second base slide rail hole 124; two stop washers 126; two return springs 128; a first base magnet 132 and a second base magnet 134; and a base member body 136.

The hinge assemblies 110, the slide member 114, the first base slide guide 120, the second base slide guide 122, the stop washers 126 and the return springs 128 collectively form a connecting mechanism 137 which couples the lid member 103 to the base member body 136 as will be explained in more detail below. The base member body 136 and the user interface base cover 108 may hereinafter be collectively referred to as the second or base member 138 (shown in FIGS. 7A to 9C) of the device 100.

In this embodiment, the lid member 103 and the base member body 136 have approximately the same length and width, although embodiments are not so limited. For example, a lid member could be longer or wider than the base member body or vice versa. In addition, various thicknesses of the elements of the device may be dependent on a particular implementation. For example, in some embodiments, a lid member, base member body, user interface base cover or other elements may be thicker or thinner than shown in FIG. 1.

The direction extending from the linked device end 101 to the free device end 102 is referred to herein as the forward direction and the opposite direction is referred to herein as the backward direction. The direction extending perpendicularly away from the base member body 136 toward the lid member 103, when the device 100 is in the closed position, is referred to herein as the upward direction and the opposite direction is referred to herein as the downward direction. An orientation in the upward and/or downward direction may be referred to as vertical. These reference directions are for ease of description and do not restrict the orientation of the elements of the device 100 including the lid member 103, the slide member 114 and the base member body 136 during use.

In this embodiment, the lid member 103 is a generally flat rectangular shape and includes an outer lid member surface 139 and an inner lid member surface 140 (shown in FIG. 2) opposite to the outer lid member surface 139. The lid member 103 will be described in more detail below.

In this embodiment, the first lid magnet 104, the second lid magnet 106, the first base magnet 132 and the second base magnet 134 are each cylindrically shaped and axially polarized. The specific shape of the magnets is not limited to cylindrical, and, in some embodiments, the magnets may be of various sizes, shapes and polarity. As will be explained below, some embodiments may not utilize magnet pairs in lid and base members, but may instead utilize elements such as shims or physical latches.

The user interface base cover 108 of this embodiment includes an interface surface 142, which has a keyboard 144. However, some embodiments may include additional interface elements in addition to or in place of the keyboard 144.

The stop washers 126 may be a standard ring type washer. The return springs 128 are standard compression springs that have an internal diameter large enough that the return springs 128 can be received on the first rail 116 and the second rail 118 of the slide member 114, respectively.

The specific designs and shapes of elements such as the user interface base cover 108, the stop washers 126 and the return springs 128 are not limited to those shown in FIG. 1. One skilled in the art will appreciate that these elements may be larger or smaller without departing from the scope of this application. Similarly, other types of washers, springs and covers may be used. Other elements which would perform similar functions to those that will be described herein may be suitable. The specific elements shown and described herein are simply provided by way of example.

Selected elements of the device 100 will now be described in more detail with reference to FIGS. 2 to 6B.

Figure 2:
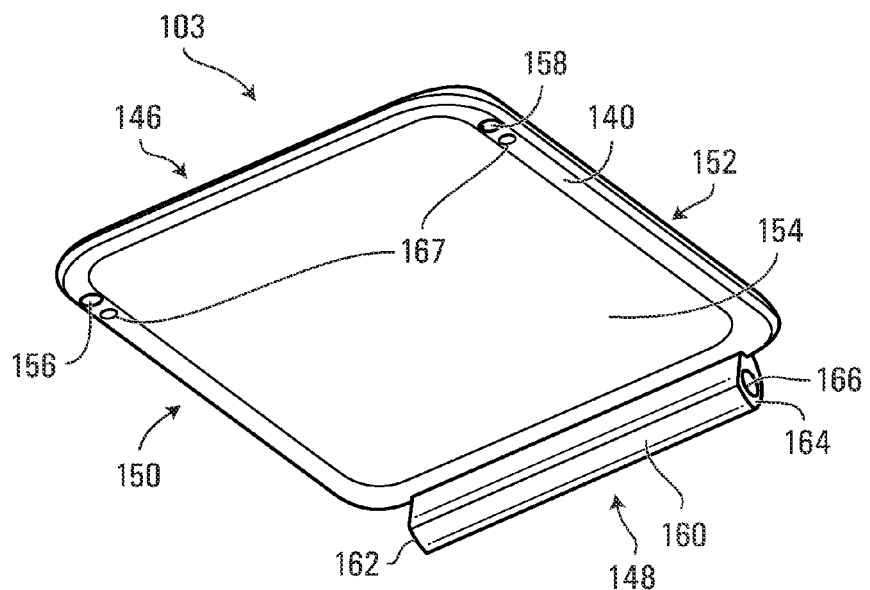
FIG. 2 is a bottom perspective view of a lid member of the mobile communication device of FIG. 1.

FIG. 2 is a bottom perspective view of the lid member 103. The bottom perspective of FIG. 2 shows the inner lid member surface 140 rather than the outer lid member surface 139 (shown in FIG. 1). In this embodiment, the lid member 103 has a first lid member end 146, a second lid member end 148 opposite to the first end 146, a first lid member side 150 and a second lid member side 152 opposite to the first lid member side 150. The lid member includes a graphical display 154 on the inner lid member surface 140. The lid member 103 further includes a first lid magnet hole 156 and a second lid magnet hole 158 defined in the inner lid member surface 140. The first lid magnet hole 156 is located near the first lid member end 146 and the first lid member side 150. The second lid magnet hole 158 is located near the first lid member end 146 and the second lid member side 152. The first lid magnet hole 156 and the second lid magnet hole 158 are shaped to receive the first lid magnet 104 and the second lid magnet 106, respectively.

The lid member 103 of this embodiment also includes a hinge extension 160. The hinge extension 160 is located at the second lid member end 148 and extends generally downward away from the inner lid member surface 140. The hinge extension 160 has a first extension side surface 162 and an opposite second extension side surface 164 which are both substantially flat. The first extension side surface 162 and the second extension side surface 164 are located inward from the first lid member side 150 and the second lid member side 152 respectively. A first hinge extension hole (not shown) and a second hinge extension hole 166 are defined near the center of the first extension side surface 162 and the second extension side surface 164 respectively. The cross-sectional thickness of the hinge extension 160 initially increases in the downward direction to accommodate the first hinge extension hole (not shown) and the second hinge extension hole 166.

The lid member 103 further includes a raised bumper 167 on the inner lid member surface 140 near each of the first lid magnet hole 156 and the second lid magnet hole 158, although embodiments are not so limited and some embodiments may omit such bumpers.

Some embodiments may utilize a lid member with a different size and/or shape than the lid member 103 described above. For example, a lid member may be more or less long, wide and/or thin. A lid member 103 may provide any one of various ways to rotatably couple to a connecting mechanism 137 (shown in FIG. 1) in some embodiments. In some embodiments, a hinge extension may be omitted or shaped differently than the hinge extension 160 shown and described herein. It will be apparent to one skilled in the art that other variations of a lid member not described herein are possible without departing from the scope of the application. The lid member 103 described herein is only an example of a suitable lid member 103 according to some embodiments.

Figure 3:
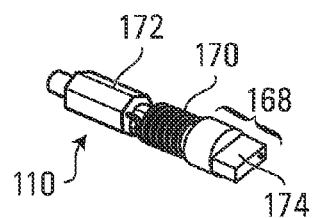
FIG. 3 is a perspective view of a hinge assembly of the mobile communication device of FIG. 1.

FIG. 3 is a perspective view of one of the hinge assemblies 110 of this embodiment. The hinge assemblies 110 are adapted to provide a torsional force to bias the device 100 toward the opened position. Each hinge assembly 110 is a standard torsion spring assembly including a cam end member 168, a torsion spring 170, and an adjustable hexagonal tension member 172. Turning the adjustable hexagonal tension member 172 with respect to the cam end member 168 adjusts the torsion force provided by the torsion spring 170. The cam end member 168 includes a substantially flat flange piece 174 which extends lengthwise in a direction opposite to the hexagonal tension member 172. One skilled in the art will appreciate that other known torsion hinge assemblies could be used to provide an opening torsional force in the device 100. The hinge assembly 110 is shown only as an example and embodiments are not limited to those implementing the specific type of hinge assembly 110 shown in FIG. 3. Any hinge assembly which is suitable to provide a torsional force sufficient to drive rotation of a lid member away from a slide and/or base member could be implemented in some embodiments. For example a spring hinge assembly having a closed assembly body cylinder, and a cam end member at one end, could be utilized in some embodiments. Some suitable hinge assemblies may include a compression spring which acts on two cam surfaces where the profiles of the cam surfaces govern the resistance and driving angles of the hinge assemblies. Some hinge assemblies may be tunable to provide torsion forces of varying strength. Alternatively, any force-providing device suitable to be used to rotate or initiate rotation of a lid member away from a base member to open a mobile communication device could be utilized.

In this embodiment, each of the first hinge extension hole (not shown) and the second hinge extension hole 166 of the lid member 103 (shown in FIG. 2) are shaped to receive one of the hinge assemblies 110, including the adjustable hexagonal tension member 172, but excluding the flange piece 174. The first hinge extension hole and the second hinge extension hole 166 are shaped such that the received hexagonal tension member 172 is fixed in position with respect to the lid member 103.

Figure 4A:
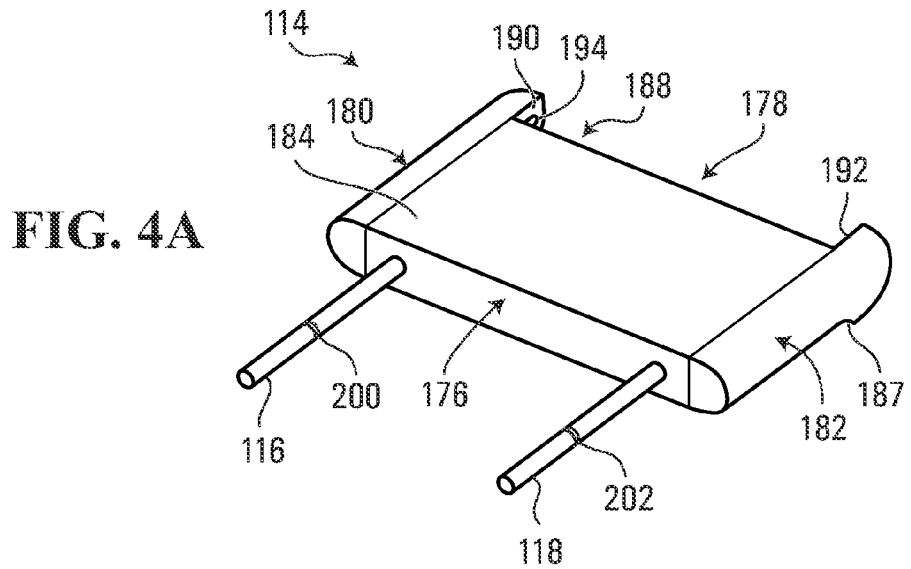
FIG. 4A is a front perspective view of a slide member of the mobile communication device of FIG. 1.
Figure 4B:
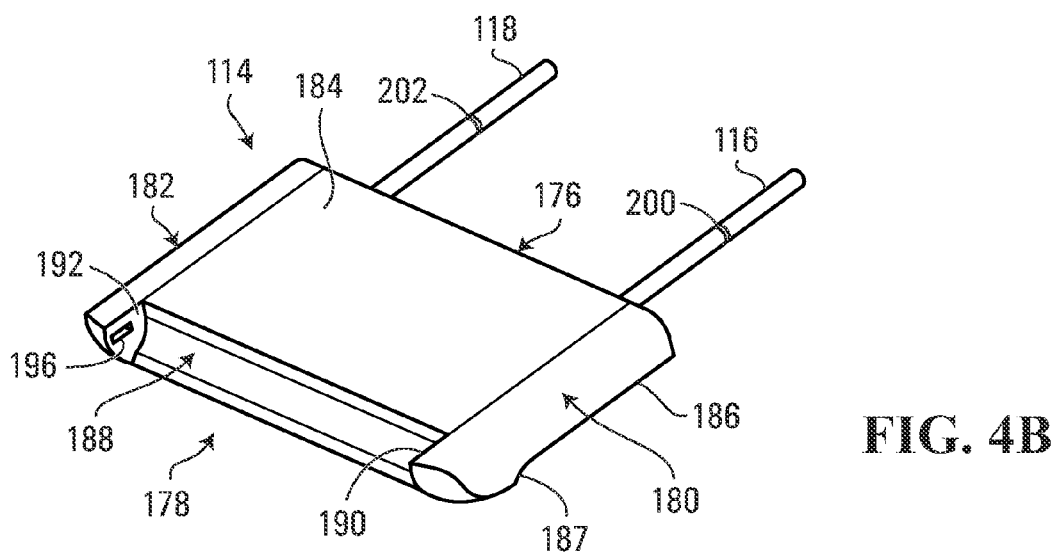
FIG. 4B is a rear perspective view of the slide member of FIG. 4A.

FIGS. 4A and 4B are front and rear perspective views of the slide member 114 of this embodiment. The slide member 114 is a generally flat rectangular shape with the first rail 116 and second rail 118 extending therefrom. The slide member has a front slide member end 176, a back slide member end 178, a first slide member side 180 and a second slide member side 182 opposite to the first slide member side 180. The first slide member side 180 and the second slide member side 182 are each rounded. The front slide member end 176 is substantially flat. The slide member 114 also has a top surface 184 and an opposite bottom surface 186 which are both substantially flat. The back slide member end 178 is rounded. There is a slide member downward step 187 from the flat bottom surface 186 to the rounded back slide member end 178.

In this embodiment, a hinge recess 188, which is shaped to provide clearance for the hinge extension 160 of the lid member 103 (shown in FIG. 2), is defined in the back slide member end 178 and the top surface 184. The hinge recess 188 has a first hinge recess side surface 190 (shown in FIG. 4A) and an opposite second hinge recess side surface 192 (shown in FIG. 4B) which are both substantially flat. The first hinge recess side surface 190 and the second hinge recess side surface 192 are near the first slide member side 180 and the second slide member side 182 respectively and are spaced apart sufficiently to accommodate the hinge extension 160. A first flange recess 194 (shown in FIG. 4A) is defined in the first hinge recess side surface 190 and a second flange recess 196 (shown in FIG. 4B) is disposed in the second hinge recess side surface 192. The first flange recess 194 and the second flange recess 196 each have a rectangular cross section shaped to receive the flange piece 174 of a respective hinge assembly 110.

The first rail 116 and the second rail 118 are each substantially cylindrically shaped and extend forwards and perpendicularly away from the front slide member end 176. The first rail 116 and the second rail 118 are substantially parallel to each other. The first rail 116 is positioned near the first slide member side 180 and the second rail 118 is positioned near the second slide member side 182. Each of the first rail 116 and the second rail 118 defines a circular groove 200/202 around its respective circumference a distance away from the front slide member end 176. Each circular groove 200/202 is shaped to receive one of the slide stop washers 126 (shown in FIG. 1). Specifically, the internal diameter of a stop washer 126 is slightly smaller than the diameter of the first rail 116 and second rail 118 such that each stop washer 126 is restricted to the respective circular groove 200/202. Each circular groove 200/202 is spaced away from the front slide member end 176 by a distance greater than the length of either of the first base slide guide 120 or the length of the second base slide guide 122.

Figures 5A, 5B:
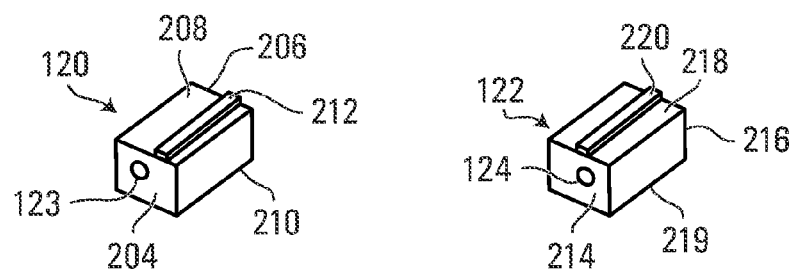
FIG. 5A is a perspective view of a first base slide guide of the mobile communication device of FIG. 1.
FIG. 5B is a perspective view of a second base slide guide of the mobile communication device of FIG. 1.

FIG. 5A is a perspective view of the first base slide guide 120. The first base slide guide 120 is generally rectangular block shaped and has a front first guide end 204, a back first guide end 206, a first guide top 208 and a first guide bottom 210, which are all substantially flat. The first base slide rail hole 123 extends through the first base slide guide 120 straight from the front first guide end 204 to the back first guide end 206. The first base slide rail hole 123 is shaped to slidably receive the first rail 116 of the slide member 114 (shown in FIGS. 4A and 4B). The first base slide guide 120 further includes a first user interface cover support strip 212 which is positioned lengthwise across the first guide top 208.

FIG. 5B is a perspective view of the second base slide guide 122. The second base slide guide 122 is shaped similar to the first base slide guide 120 and includes a front second guide end 214, a back second guide end 216, a second guide top 218 and a second guide bottom 219, which are all substantially flat. The second base slide guide 122 includes the second base slide rail hole 124 which also extends through the length of the second base slide guide 122. The second base slide guide 122 also includes a second user interface cover support strip 220 which is positioned lengthwise across the second guide top 218.

It is to be understood that the specific design and details of the first base slide guide 120 and the second base slide guide 122 are provided only as an example. In some embodiments, base slide guides need not be block shaped and base slide guides may be larger or smaller than the first base slide guide 120 and the second base slide guide 122. User interface cover support strips may be omitted in some embodiments. In some embodiments, base slide guides could be designed with recesses or grooves to reduce the contact area between base slot guides and slide member rails in order to minimize friction between the elements. Any element suitable to act as a guide for rails or other slide runners could be implemented in other embodiments. For example, some embodiments could utilize base slide guides which are not rectangular blocks (such as cylindrical or ring shaped, for example) which define holes shaped for receiving slide rails.

Figure 6A:
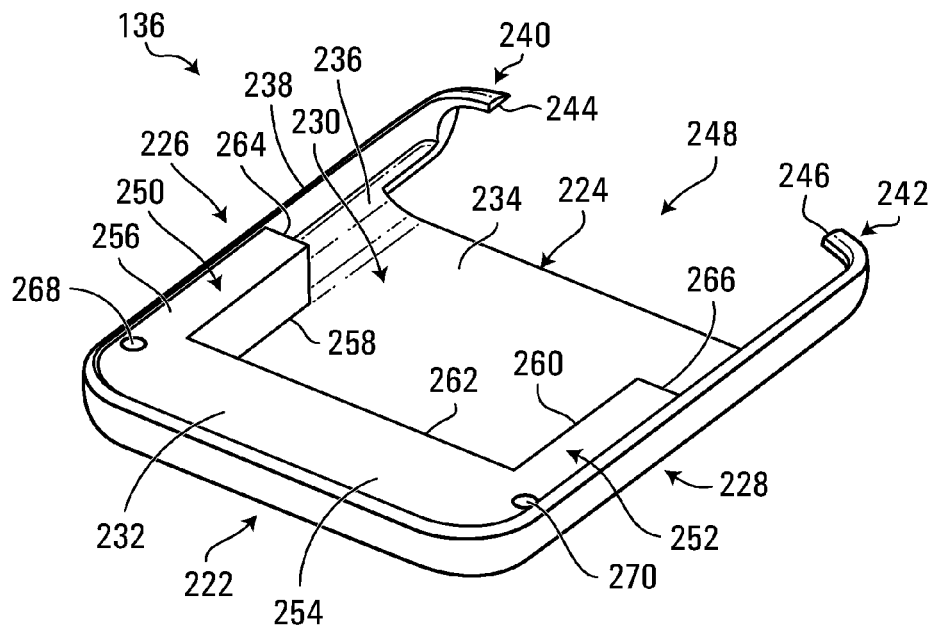
FIG. 6A is a front perspective view of a base member body of the mobile communication device of FIG. 1.
Figure 6B:
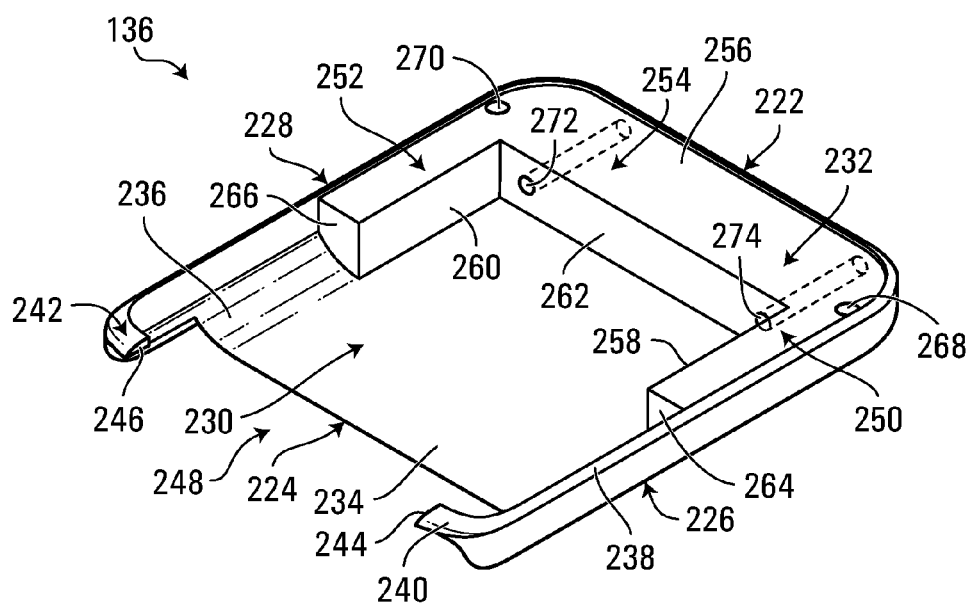
FIG. 6B is a rear perspective view of the base member body of FIG. 6A.

FIGS. 6A and 6B are front and rear perspective views of the base member body 136 respectively according to this embodiment. The base member body 136 includes a front base body end 222, a back base body end 224, a first base body side 226 and an opposite second base body side 228. The base member body 136 generally consists of an outer piece 230 and an inner piece 232 although embodiments are not so limited.

In this embodiment, the outer piece 230 includes a substantially flat base member bottom 234 which extends between the front base body end 222, the back base body end 224, the first base body side 226 and the second base body side 228. The outer piece 230 is bounded by a curved lip 236 with an upper edge 238 which forms the front base body end 222, the first base body side 226 and the second base body side 228. The curved lip 236 and upper edge 238 include a first base extension 240, a second base extension 242, a first back rounded corner 244 and a second back rounded corner 246 which curve inward from the first base body side 226 and the second base body side 228 respectively. The outer piece 230, essentially, forms a rectangular bowl-type shape having a base body recess 248 which is shaped to receive the slide member 114. The base body recess 248 is formed between the first base extension 240 and the second base extension 242. The outer piece 230 is shaped to receive the slide member 114 (shown in FIGS. 4A and 4B) such that a slight gap is present between the flat bottom surface 186 (shown in FIGS. 4A and 4B) of the slide member 114 and the base member bottom 234.

The slide member downward step 187 (shown in FIGS. 4A and 4B) is approximately equal in depth to the thickness of the outer piece 230 of the base member body 136, although embodiments are not limited. As mentioned above, a slide member suitable for use in some embodiments may be shaped differently than the slide member 114 (shown in FIGS. 4A and 4B).

In this embodiment, the inter piece 232 of the base member body 136 is generally U-shaped and fits along the inside of the curved lip 236 of the outer piece 230. The inner piece 232 has a first arm section 250, a second arm section 252 and a bridge section 254 connecting the first arm section 250 and the second arm section 252. The bridge section 254 extends along curved lip 236 at the first base body end 222. The first arm section extends partially along the curved lip 236 at the first base body side 226. The second arm section extends partially along the curved lip 236 at the second base body side 228. The inner piece 232 has a substantially flat top inner piece surface 256 and which is approximately level with the upper edge 238 of the outer piece 230. The height/thickness of each of the first base slide guide 120 and the second base slide guide 122 (including the respective first user interface support strip 212 and the second interface support strip 220) is also approximately equivalent to the height/thickness of the top inner piece surface 256.

The inner piece 232 has a first inner piece side surface 258, a second inner piece side surface 260 and an inner piece end surface 262, which are each substantially flat. The first inner piece side surface 258 is a surface of the first arm section 250 opposite to the first base body side 226. The second inner piece side surface 260 is a surface of the second arm section 252 opposite to the second base body side 228. The inner piece back surface 262 is a surface of the bridge section 254 which is opposite to the first base body end 222. The first arm section 250 and the second arm section 252 terminate at a first arm end surface 264 and a second arm end surface 266 respectively, which are substantially flat.

The total length from either of the first back rounded corner 244 and the second back rounded corner 246 to the inner piece back surface 262 is shorter than the total length of the slide member 114 (shown in FIG. 4A and 4B) including the first rail 116 and the second rail 118 (also shown in FIGS. 4A and 4B).

In this embodiment, a first base magnet hole 268 and a second base magnet hole 270 are defined in the top inner piece surface 256 near the first base body side 226 and the second base body side 228 respectively and near the first base body end 222. The first base magnet hole 268 and the second base magnet hole 270 are shaped to receive the first base magnet 132 and the second base magnet 134 respectively. The first base magnet hole 268 and the second base magnet hole 270 are positioned so that they are vertically aligned with the first lid magnet hole 156 and the second lid magnet hole 158 when the device is in the closed position (shown in FIG. 7A).

A first base body rail hole 272 and a second base body rail hole 274 (shown in FIG. 6B as dotted lines to indicate where they are hidden from view by the inner piece 232) are defined in the inner piece end surface 262. The first base body rail hole 272 and the second base body rail hole 274 extend into and completely through the inner piece 232, shaped to receive the second rail 118 and the first rail 116 of the slide member 114 (shown in FIGS. 4A and 4B) respectively.

The user interface base cover 108 (shown in FIG. 1) is a flat and thin generally rectangular member shaped to fit and be aligned with the upper edge 238 of the base member body 136 while providing clearance for the hinge extension 160 of the lid member 103 (shown in FIG. 2). However, in some embodiments, a user interface base cover and a base member body may not be shaped complimentary to each other. For example, in some embodiments, a user interface base cover may be omitted or may only cover a part of a base member body.

Some embodiments may utilize a base member with a different size and/or shape than the base member body 136 described herein. For example, a base member body may be more or less long, wide and/or thin. In addition, a base member in some embodiments may include an integrated inner surface having interface elements rather than an attached user interface base cover such as the user interface base cover 108 (shown in FIG. 1). A base member body in some embodiments may omit the first base body extension 240 and the second base body extension 242. In some embodiments, a base member body 136 may provide different means to slidably engage a connecting mechanism such as the connecting mechanism 137 (shown in FIG. 1) including the slide member 114 (shown in FIGS. 4A and 4B). It will be apparent to one skilled in the art that other variations of a base member body not described herein are possible without departing from the scope of the application. The base member body 136 described herein is only an example of a suitable base member body for some embodiments.

Figure 8B:
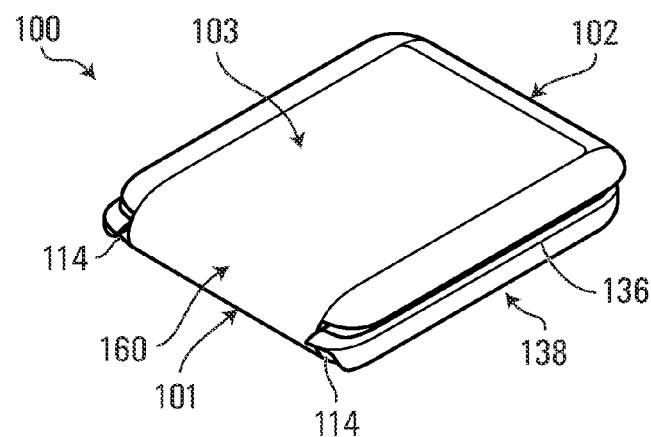
FIG. 8B is a perspective view of the mobile communication device of FIG. 1 in the displaced position.
Figure 8C:
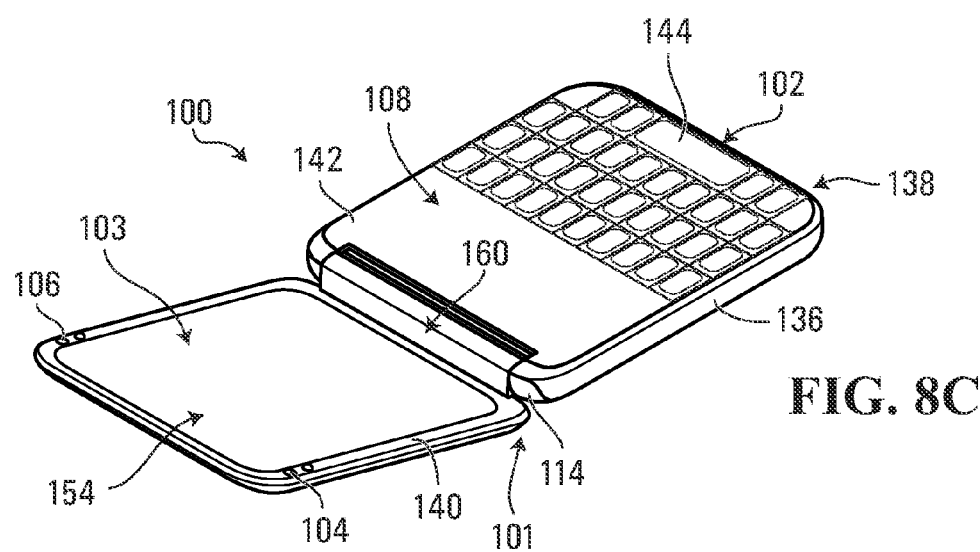
FIG. 8C is a perspective view of the mobile communication device of FIG. 1 in the opened position.

The assembly of the elements of the device 100 will now be described with reference to FIGS. 7A and 8C. FIGS. 7A to 7C are cutaway top views of the device 100 in the closed position, a displaced position, and an opened position respectively. The lid member 103 and the user interface base cover 108 (shown in FIG. 7C) are cut away in FIGS. 7A to 7C. FIGS. 8A to 8C are rear perspective views of the device 100 in the closed, displaced, and opened positions respectively.

Turning to FIGS. 7A to 7C, the first rail 116 of the slide member 114 is received in the first base slide rail hole 123 (shown in FIG. 1) of the first base slide guide 120, one of the stop washers 126 and one of the return springs 128. The second rail 118 of the slide member 114 is received in the second base slide rail hole 124 (shown in FIG. 1) of the second base slide guide 122, the other of the stop washers 126, and the other of the return springs 128. The stop washers 126 are received in, and restricted to, the respective circular groove 200/202 (shown in FIGS. 4A and 4B) of the first rail 116 and the second rail 118 rail respectively.

The first base slide guide 120 is positioned between the respective stop washer 126 and the front slide member end 176 with some room for sliding movement of the slide member 114 in the forward direction. The respective return spring 128 is positioned between the respective stop washer 126 and the inner piece back surface 262 of the base member body 136. A portion of the first rail 116 protrudes into the first base body rail hole 272, which is shown with dotted lines in FIG. 7A to indicate these elements are hidden by the inner piece 232 of the base body member 136. The second rail 118, the second base slide guide 122, the respective slide stop washer 126, the respective return spring 128, and the second base body rail hole 274 (also shown in a dotted line) are similarly arranged. The slide member 114, including the first rail 116 and the second rail 118 is long enough such that the first rail 116 and the second rail 118 do not exit the first base body rail hole 272 or the second base body rail hole 274 during operation. This slide member 114 length may ensure that the first rail 116 and the second rail 118 do not snag on coils of the return springs.

The first base slide rail hole 123 and the second base slide rail hole 124 slidably engage the slide member 114 and may provide support for the slide member 114 as well as ensure that the slide member 114 is properly aligned laterally and vertically.

The slide member 114 is received through, and fills, the base body recess 248 (shown in FIG. 6A and 6B). In this embodiment, there is a slight gap between the flat bottom surface 186 (shown in FIGS. 4A and 4B) of the slide member 114 and the base member bottom 234. The back slide member end 178 (shown in FIGS. 4A and 4B) forms part of the linked device end 101. The back slide member end 178 is approximately aligned with the upper edge 238 of the base member body 136 at the first rounded corner 244 and the second rounded corner 246. In the closed position shown in FIG. 7A, there is space between the front slide member end 176 and each of the first and second arm end surfaces 264 and 266. The first base slide guide 120 and the second base slide guide 122 are fixedly attached to the base member bottom 234 by any acceptable means for attaching such as glue, solder, screws etc. Specifically, the first guide bottom 210 (shown in FIG. 5A) and the second guide bottom 219 (shown in FIG. 5B) are attached to the base member bottom 234. The first base slide guide 120 and the second base slide guide 122 are generally located between the first inner piece side surface 258 and the second inner piece side surface 260. In some embodiments, the first base slide guide 120 and the second base slide guide 122 may be integral to the base member body 136.

The first base slide guide 120 and the second base slide guide 122 are positioned to extend slightly more backward on the base member body 136 than the first arm end surface 264 and the second arm end surface 266 of the base member body 136. This positioning of the first base slide guide 120 and the second base slide guide 122 is to ensure that the slide member 114 translational displacement in the forward direction is controlled by the base slide guides 120/122 rather than the length of the arm sections 252/250 (shown in FIGS. 6A and 6B).

The slide member 114 is free to move forwards with respect to the base member body 136 from the closed position shown in FIG. 7A. The movement of the slide member 114 is restricted in the forward direction by the interaction of the front slide member end 176 with the back first guide end 206 and the back second guide end 216 of the first and second slide guides 120/122. The slide member 114 movement is restricted in the backward direction by the interaction of the stop washers 126 with the front first guide end 204 and the front second guide end 214 of the first and second slide guides 120/122 respectively. Thus, the stop washers 126 attached to first rail 116 and the second rail 118 prevent disassembly of the slide member 114 from base member body 136.

The stop washers 126 also provide a surface for the return springs 128 to act against and push/hold the slide member 114 in the rest position. The return springs 128 are partially compressed between each respective stop washer 126 and the inner piece back surface 262 such that the return springs 128 provide a return force pushing the stop washers 126 away from the inner piece 232 of the base member body 136. In this way, the springs may be referred to as a return mechanism, which in this case, is a mechanical biasing mechanism (i.e. return springs 128 and stop washers 126). The return force biases the slide member 114 to remain in a rest position shown in FIGS. 7A and 7C in which the slide member 114 is in a backmost position. In the rest position shown in FIGS. 7A and 7C, there is a small amount of space between the front slide member end 176 and each of the first base slide guide 120 and the second base slide guide 122. The lid member 103 is aligned with the base member 138 and will be referred to herein as not being translationally displaced. Thus, the lid member 103 may move translationally, or be displaced, in the forward direction with respect to the base member 138.

Embodiments are not limited to those using the elements shown in FIGS. 1 to 9C to provide slide functionality. The slide member 114, the first base slide guide 120, the second base slide guide 122, the stop washers 126 and the return springs 128 are provided only as an example of elements suitable for providing slide functionality, and one or more of these elements may be omitted or shaped differently in some embodiments. Embodiments may use other elements to provide similar slide and/or displacement capability. A sliding engagement between a hinge mechanism and a base member may be implemented using any variety of different means. Any suitable slide mechanism that allows displacement of the lid member with respect to the base member could be implemented in some embodiments. For example, some embodiments may implement other slide runner elements such as interlinked tabs to provide slide functionality. Other embodiments may provide a base member having lips or flanges along inner sides of the base member to act as a slide runner in contact with the sides of a simple slide member, where the slide member does not have additional rails or other runner elements. It will be apparent to one skilled in the art that other variations of base slide guides not described herein are possible without departing from the scope of the application.

Turning to FIGS. 8A to 8C, the user interface base cover 108 (shown in FIG. 8C) is fixedly attached to the base member body 136 and is generally aligned with the upper edge 238 of the base member body 136. Again, any acceptable means to attach the user interface base cover 108 to the base member body 136 may be implemented (such as glue, solder, screws etc.). In some embodiments, the user interface base cover 108 may be covered or partially covered by plastic molded components assembled with screws, glue, or double sided tape. The user interface base cover 108 (shown in FIG. 8C) rests on and may be supported by the top inner piece surface 256 of the base member body 136 (shown in FIGS. 6A and 6B) and each of the first user interface support strip 218 and the second user interface support strip 220 (shown in FIGS. 7A to 7C).

The first lid magnet 104 and the second lid magnet 106 (both shown in FIG. 8C) are received in the first lid magnet hole 156 and the second lid magnet hole 158 (both shown in FIG. 2) respectfully. The magnetic poles of the first lid magnet 104 and the first base magnet 132 are arranged in the lid member 103 and the base member body 136 respectively such that the first lid magnet 104 and the first base magnet 132 are attracted to each other when the lid member 103 and the base member 138 are adjacent and the first lid magnet 104 and the first base magnet 132 are vertically aligned. For example, the first lid magnet 104 may be arranged so that its north pole is the most adjacent to the base member 138 when the device 100 is in the closed position. The first base magnet 132 would then be arranged so that its south pole is most adjacent to the lid member 103 when the device 100 is in the closed position. The polar reverse arrangement of the first lid magnet 104 and the first base magnet 132 is also possible.

Thus the first lid magnet 104 and the first base magnet 132 form a pair of retaining mechanism elements which engage to hold the device 100 closed when the device 100 is in the closed position. The second lid magnet 106 and the second base magnet 134 are similarly arranged to form a pair of first and second retaining mechanism elements to provide an attractive force. It is to be understood that more or less pairs of retaining mechanisms such as aligned magnet pairs may be used in some embodiments.

As briefly described above, the flange pieces 174 on respective cam ends members 168 of the hinge assemblies 110 (all shown in FIG. 3) are received in the first flange recess 194 and the second flange recess 196 (both shown in FIG. 4B) of the slide member 114 respectively. The flange piece 174 of each of the hinge assemblies 110 is, therefore, rotatably fixed with respect to the slide member 114. The remainder of the hinge assemblies 110 are received in the the second hinge extension hole 166 and the first hinge extension hole (not shown) respectively such that the adjustable hexagonal torsion member 172 of each hinge assembly 110 is rotatably fixed to the lid member 103. The lid member 103 is rotatably engaged to the slide member 114 and can rotate with respect to the base member 138 and the slide member 114 about the hinge assemblies 110. The second lid member end 148, including the hinge extension 160 (shown in FIG. 2) completes the linked device end 101 with the back slide member end 178 (shown in FIGS. 4A and 4B).

The hinge assemblies 110 (shown in FIGS. 1 and 3) are configured to provide a torsional opening force to bias the lid member 103 to rotate away from the base member 138 such that the lid member 103 is biased to move from the closed position shown in FIG. 8A to the opened position shown in FIG. 8C. However, the attractive force provided by the first and second lid magnets 104/106 and the respective first and second base magnets 132/134, when aligned and sufficiently proximate to each other, is stronger than the torsional opening force provided by the hinge assemblies 110 (shown in FIGS. 1 and 3).

As will be explained in more detail below, when the device is in the closed position shown in FIG. 8A, the attractive force provided by the first and second lid magnets 104/106 and the respective first and second base magnets 132/134 prevents the lid member 103 from rotating away from the base member 138. As will also be explained below, translationally displacing the lid member 103 with respect to the base member 138 (as shown in FIG. 8B) misaligns the lid magnets 104/106 from the respective first and second base magnets 132/134, thereby reducing the magnetic attractive force. With the magnetic attractive force reduced, the torsional force provided by the hinge assemblies 110 is no longer overcome and the hinge assemblies can drive movement of the device 100 to the opened position shown in FIG. 8C.

Figure 9A:
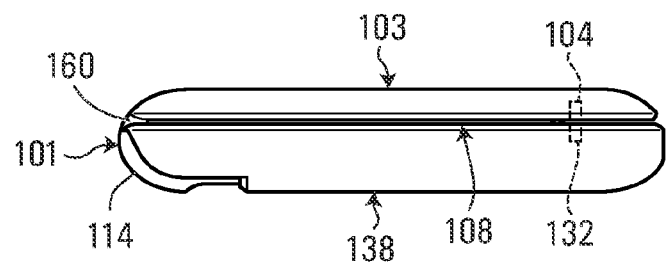
FIG. 9A is a side view of the mobile communication device of FIG. 1 in the closed position.
Figure 9B:
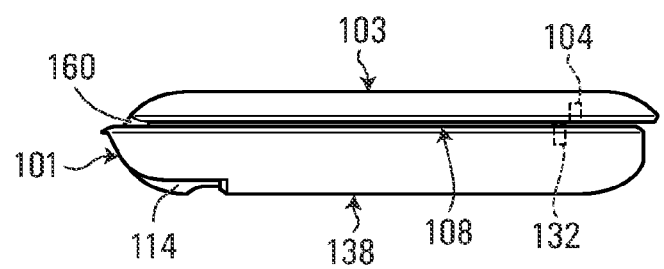
FIG. 9B is a side view of the mobile communication device of FIG. 1 in the displaced position.
Figure 9C:
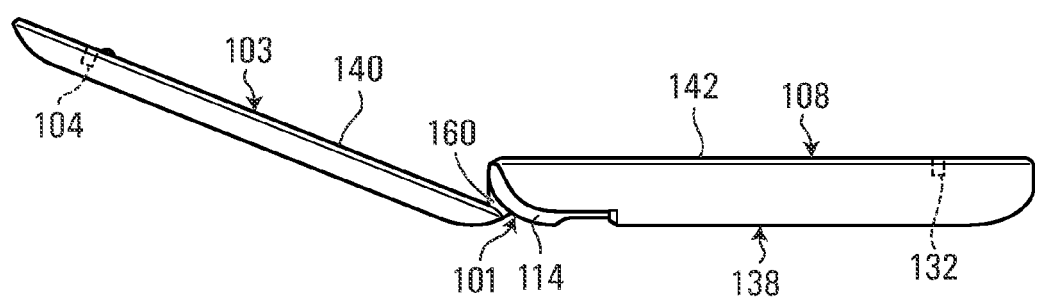
FIG. 9C is a side view of the mobile communication device of FIG. 1 in the opened position.

The interaction of the elements of the device 100 will now be described with reference to FIGS. 7A to 9C. FIGS. 9A to 9C are side views of the device 100 in the closed, displaced, and opened positions. The first lid magnet 104 and the first base magnet 132 are shown with dotted lines to indicate that they are hidden by the lid member 103 and the base member 138 respectively.

The connecting mechanism 137 (labeled in FIG. 1) rotationally and translationally couples the lid member 103 and the base member 138. Specifically, the connecting mechanism 137 enables both a slide functionality and a rotatable hinge functionality. The connecting mechanism 137 is slidably connected to the base member 138 and rotatably connected to the lid member 103. The slide member 114 and the lid member 103 may be translationally displaced with respect to the base member body 136. In addition, the lid member 103 may rotate with respect to base member 138.

Starting from the closed position shown in FIGS. 7A, 8A and 9A, the linked device end 101 is not translationally displaced and the slide member 114 is in the rest position. As mentioned above, the slide member 114 naturally rests in this position due the force provided by the return springs 128 (shown in FIG. 8A). The lid member 103, which is rotatably coupled to the slide member 114, is aligned with and approximately adjacent to the base member 138. The bumpers 167 (shown in FIG. 9C) of the lid member 103 act as a physical stop and provide a slight separation between the lid member 103 and the base member 138. The bumpers 167 control a cosmetic gap between lid member 103 and base member 138. The bumpers 167 also provide a local contact point between the inner lid member surface 140 and the interface surface 142 (both shown in FIGS. 7C, 8C and 9C) to minimize friction during sliding. Specifically, the interface surface 142 of the user interface base cover 108 (shown in FIGS. 7C, 8C and 9C) is slightly separated from the inner lid member surface 140 (shown in FIGS. 7C, 8C and 9C). As shown in FIG. 9A, the first lid magnet 104 and the first base magnet 132 are vertically aligned and almost adjacent. The second lid magnet 106 (not shown) and the second base magnet 134 (not shown) are similarly aligned and almost adjacent. The attractive force provided by the first and second lid magnets 104/106 and the first and second base magnets 132/134 is sufficient to overcome the torsional opening force provided by the hinge assemblies 110 (shown in FIGS. 1 and 3) and the device 100 may, therefore, remain closed without user interaction. Therefore, the first and second lid magnets 104/106 and the first and second base magnets 132/134 together form two retaining mechanisms which are engaged when the device 100 is in the closed position. Some embodiments may utilize more or less retaining mechanisms.

In order to open the device 100, a user may press on the linked device end 101 and/or the lid member 103 in the forward direction. Essentially, the user may apply pressure to the linked device end 101, thereby translationally displacing the slide member 114 and the lid member 103 to move the device to the displaced position shown in FIGS. 7B, 8B, and 9B. Pushing on the linked device end 101 displaces both the slide member 114 and lid member 103 in the forward direction. The slide member 114 and lid member 103 move together because they are connected by the hinge assemblies 110 (shown in FIGS. 1 and 3). Therefore, a user could provide a forward force to the lid member 103 or the slide member 114 elsewhere than the linked device end 101 in order to displace the lid member 103.

The translational displacement of the lid member 103 is stopped by the interaction of the slide member 114 with the first base slide guide 120 and the second base slide guide 122 (both shown in FIG. 7B). In the displaced position, the first and second lid magnets 104/106 (shown in FIG. 9C) and the respective first and second base magnets 132/134 (shown in FIG. 9C) are no longer vertically aligned or are disengaged. The attractive force holding the device 100 closed may be reduced or essentially absent. The torsional opening force provided by the hinge assemblies 110 (shown in FIGS. 1 and 3) is no longer overcome by the attractive force, and the lid member 103 will rotate away from the base member 138 and the free device end 102 toward the opened position. In this way, displacing the lid member 103 in the forward direction initiates opening of the device 100. The user drives a slide action of the device 100 and the hinge assemblies 110 drive a flip action of the device 100. The return springs 128 are compressed further in the displaced position, and provide a stronger return force.

Once the lid member 103 has begun to rotate away from the base member 138, the user may cease pressing the linked device end 101 and the lid member 103. Due to the return force provided by the return springs 128, the slide member 114 and the lid member 103 will slide back to the rest position in which the lid member 103 and the slide member 114 are aligned with the linked device end 101. Specifically, the return springs 128 act against the respective stop washers 126 to push the slide member 114 back to its rest position. The device 100 will, therefore, move to the opened position shown in FIGS. 7C, 8C, and 9C.

The hinge extension 160 (shown in FIG. 2) of the lid member 103 and the surface of the hinge recess 188 (shown in FIGS. 4A and 4B) interfere to physically stop the rotation of the lid member 103 away from the base member 138. In this embodiment, the lid member 103 opens to approximately 165 degrees, although embodiments are not so limited and other angles could be chosen for some embodiments. In some embodiments, other means for defining the open angle of the lid member 103 with respect to the base member 138 may be utilized. For example, a hinge assembly which defines a maximum rotation could be used to link a lid member and a slide member in some embodiments.

As can be seen in FIGS. 7C, 8C, and 9C, when the device 100 is in the opened position, the slide member 114 is again in the rest position and aligned with the linked device end 101. The lid member 103 is rotated to an angle with respect to the base member 138 so that the graphical display 154 and the keyboard 144 (both shown in FIGS. 8C) are accessible.

To close the device 100, the user may simply rotate the lid member 103 back to a position adjacent to the base member 138 so that the device 100 is in the closed position shown in FIGS. 7A, 8A, and 9A. The first and second lid magnets 104/106 will again be vertically aligned with, and almost adjacent to the first and second base magnets 132/134, thus re-engaging the attractive force to retain the device 100 in the closed position. Embodiments are not limited to the closed and opened positions described above, and other closed and opened positions may be possible. For example, a lid member could be rotated by various angles with respect to a base member when a device is opened.

As can be seen, the linked device end 101, including the lid member 103 and the slide member 114, essentially becomes a virtual push button for opening the device which can be activated by pressing or applying force to the linked device end 101. A user of the device 100 may be able to press the linked device end 101 and/or the lid member 103 to open the device 100 without loosening or releasing their grip on the device 100, even if the device 100 is held with only one hand. For example, the user may be able to use their index finger to provide the necessary forwards force on the linked device end 101 while their remaining fingers and thumb continue to grip the base member 138 of the device 100.

Some embodiments may use means other than a sliding engagement between a connecting mechanism and the base member to enable translational forward displacement of the lid member 103. For example, some embodiments may utilize a horizontally collapsible/expandable hinge to provide a forward displacement ability for the lid member.

In some embodiments, more or less pairs of lid and base magnets may be arranged as retaining mechanisms. Some embodiments may use a retaining mechanism different than lid and base magnets. For example, some embodiments may use one or more metal shims in either a lid member or a base member in conjunction with one or more magnets in the other member to provide the necessary attractive force to keep the device closed. For example, physical latching mechanisms, such as releasable latches known in the art could be utilized. Any suitable retaining mechanism that is configured to release when a lid member and/or slide member is displaced with respect to a base member could be utilized in some embodiments.

Embodiments are not limited to those providing a retaining mechanism which overcomes an opening force provided by a connecting mechanism. In some embodiments, an opening mechanism which provides a force to open the device when a lid member is displaced, but does not produce a force when the lid is not displaced, could be utilized. For example, magnets in a base member and a lid member may be arranged to provide a repulsive force when the lid member is moved to a displaced position. In such an embodiment, the magnets could provide an opening force which at least partially moves the lid member away from a base member. It will be apparent to one skilled in the art that still other arrangements for providing a virtual push button with the appropriate retaining and/or opening forces are possible in accordance with this application.

Embodiments are not limited to those using springs to provide a return force or washers to define a rest position of a slide member. For example, axially polarized magnetic rods could be used to perform similar functions. Still other suitable means to bias a slide member and to define a rest position of the slide member (elastic bands, for example) could be implemented in some embodiments.

Figure 10A:
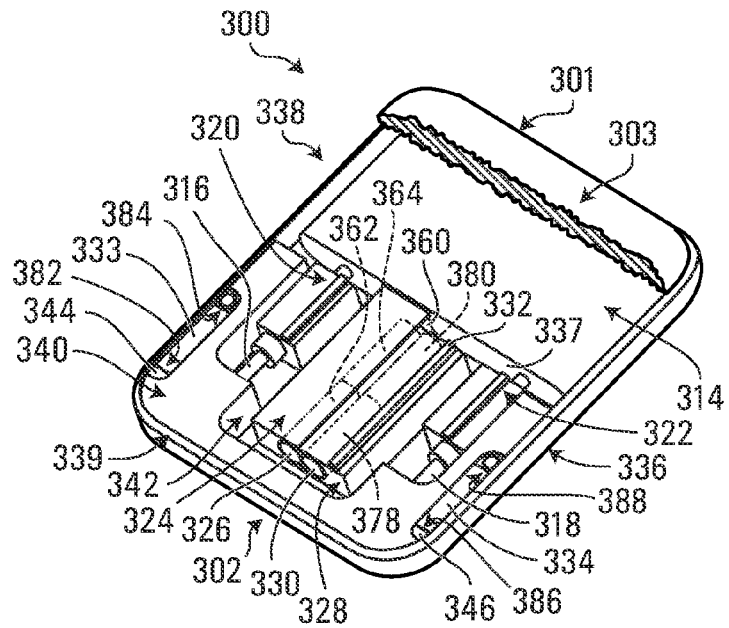
FIG. 10A is a cutaway perspective view of a mobile communication device according to a second embodiment in a closed position with a lid member and a user interface base cover cut away.
Figure 10B:
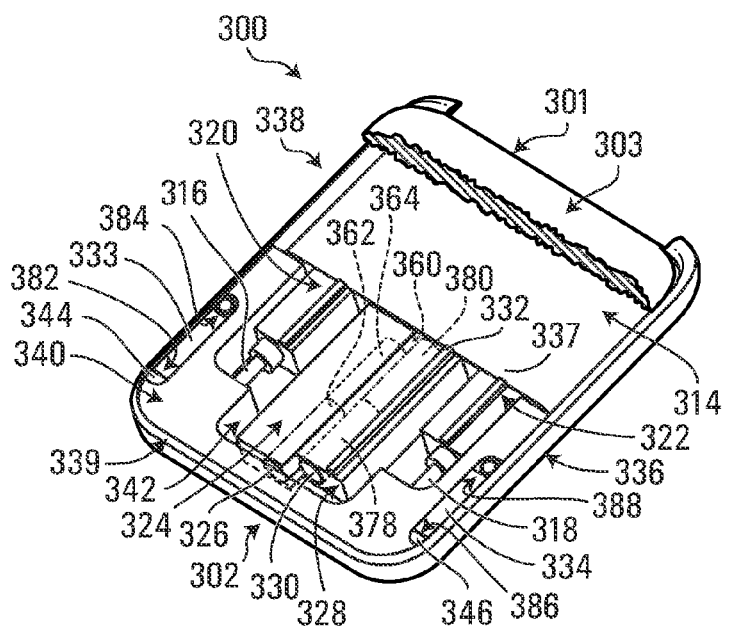
FIG. 10B is a cutaway perspective view of the mobile communication device of FIG. 10A in a displaced position with the lid member and the user interface base cover cut away.
Figure 10C:
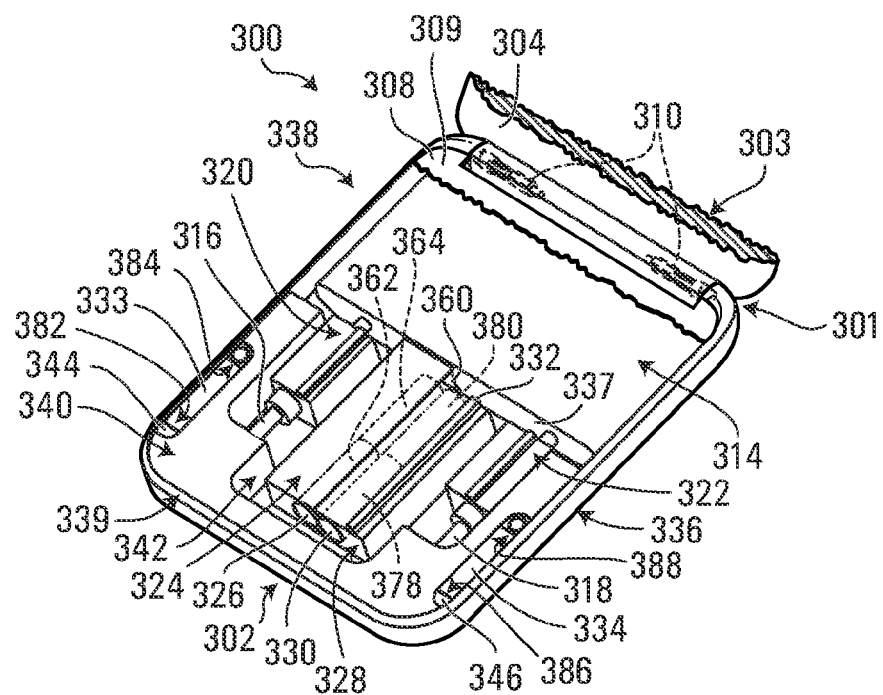
FIG. 10C is a cutaway perspective view of the mobile communication device of FIG. 10A in an opened position with the lid member and the user interface base cover cut away.

A mobile communication device according to a second embodiment will now be described with reference to FIGS. 10A to 12C. FIGS. 10A to 10C are cutaway perspective views of a mobile communication device 300 in closed, displaced, and opened positions respectively.

The device 300 has a linked device end 301 and a free device end 302. The device 300 includes: a first or lid member 303 having an inner lid member surface 304 (shown in FIG. 10C); a first lid magnet 306 (shown in FIGS. 12A to 12C) and a second lid magnet (not shown); bumpers 307; a user interface base cover 308 having an interface surface 309 (shown in FIG. 10C); two hinge assemblies 310 (shown in FIG. 10C); a slide member 314 having a first rail 316 and a second rail 318; a first base slide guide 320 and a second base slide guide 322; a slide magnet assembly 324 having a slide rod magnet 326; a base magnet assembly 328 having a base rod magnet 330 and a base user interface support strip 332; a first metal shim 333 and a second metal shim 334; and a base member body 336. The hinge assemblies 310 are shown in dotted lines in FIG. 10O to indicate that they are hidden by the lid member 303 and the slide member 314.

The lid member 303, the first lid magnet 306 and the second lid magnet, the bumpers 307, the user interface base cover 308, the hinge assemblies 310, the slide member 314, the first base slide guide 320 and the second base slide guide 322 of this embodiment are essentially equivalent to the lid member 103, the first and second lid magnets 104/106, the user interface base cover 108, the hinge assemblies 110, the slide member 114, the first base slide guide 120 and the second base slide guide 122 of the embodiment shown in FIGS. 1 to 9C, and are also similarly arranged. The forwards, backwards, upward and downward directions are also equivalently defined for the purpose of the description of the device 300.

The lid member 303 may include a graphical display (not shown) on the inner lid member surface 304 (shown in FIG. 10C) and the user interface base cover 308 may include a keyboard (not shown) on the interface surface 309 (shown in FIG. 10O). As described above, embodiments are not limited by any particular arrangement of interface elements such as a graphical display and a keyboard.

The slide member 314 has a front slide member end 337 which is substantially flat.

The base member body 336 and the user interface base cover 308 may hereinafter be collectively referred to as a second or base member 338 of the device 300.

The base member body 336 includes an outer piece 339 and an inner piece 340. The outer piece 339 of this embodiment is essentially equivalent to the outer piece 230 of the base member body 136 of the embodiment shown in FIGS. 1 to 9C. The inner piece 340 of this embodiment is substantially similar to the inner piece 232 of the embodiment shown in FIGS. 1 to 9C. However, the inner piece 340 of this embodiment shown in FIGS. 10A to 10C includes a magnet assembly recess 342 which is shaped to at least provide clearance for the slide magnet assembly 324 and the base magnet assembly 328. The inner piece 340 also includes a first shim recess 344 and a second shim recess 346 in similar positions as the first base magnet hole 268 and the second base magnet hole 270 of the embodiment shown in FIGS. 1 to 9C. The first shim recess 344 and a second shim recess 346 are generally rectangular, although embodiments are not so limited.

The first metal shim 333 and the second metal shim 334 are rectangular shaped. The first metal shim 333 has a front first shim end 382 and an opposite back first shim end 384. The second metal shim 334 has a front second shim end 386 and an opposite back second shim end 388. The first metal shim 333 and the second metal shim 334 may be formed of mild steel. It is to be understood that any material which is sufficiently attracted to magnets may be suitable for use as a shim in some embodiments. In some embodiments, metal shims may be circular or otherwise shaped. The first shim recess 344 and the second shim recess 346 are shaped to fit at least the first metal shim 333 and the second metal shim 334 respectively.

The slide magnet assembly 324 and the base magnet assembly 328 will now be described in more detail with reference to FIGS. 11A and 11B. The device 300 will then be further described turning back to FIGS. 10A to 10C.

Figures 11A, 11B:
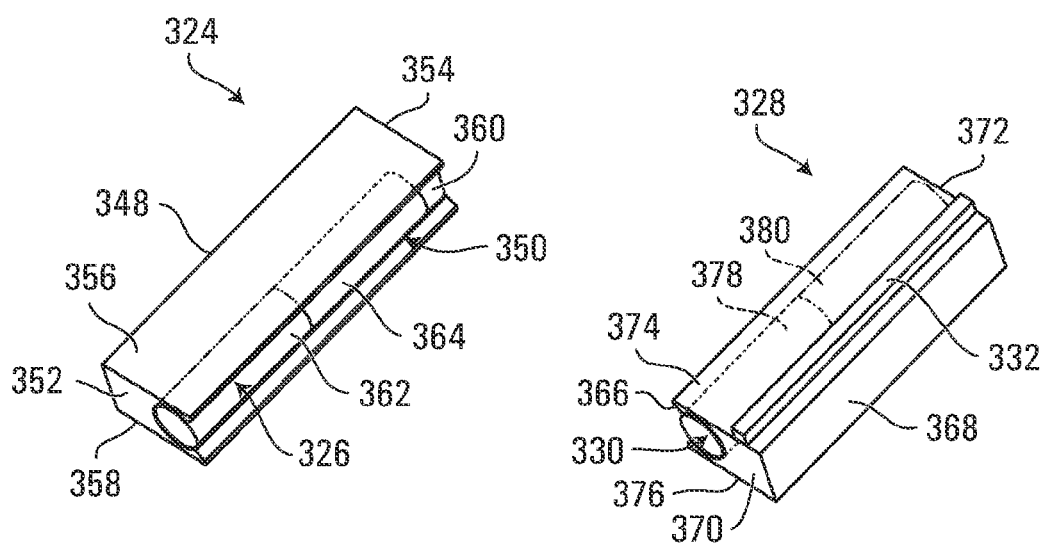
FIG. 11A is a perspective view of a slide magnet assembly of the mobile communication device of FIG. 10A.
FIG. 11B is a perspective view of a base magnet assembly of the mobile communication device of FIG. 10A.

FIG. 11A is a perspective view of the slide magnet assembly 324. In this embodiment, the slide magnet assembly 324 is generally rectangular block shaped and includes a slide magnet assembly side 348, an opposite slide magnet assembly side groove 350, a front slide magnet assembly end 352, a back slide magnet assembly end 354, a slide magnet assembly top 356, and a slide magnet assembly bottom 358. The slide magnet assembly side groove 350 is a lengthwise recess which is shaped to receive the slide rod magnet 326. The slide magnet assembly side 348, the front slide magnet assembly end 352, the back slide magnet assembly end 354, the slide magnet assembly top 356, and the slide magnet assembly bottom 358 are all substantially flat, although embodiments are not so limited.

The slide rod magnet 326 is cylindrically shaped positioned lengthwise in the slide magnet groove 350. The slide rod magnet 326 extends from the front slide magnet assembly end 352 almost to the back slide magnet assembly end 354. The slide magnet assembly 324 is longer than the slide rod magnet 326 such that a back end portion 360 of the slide magnet assembly 324 extends from the slide rod magnet 326 to the back slide magnet assembly end 354. The slide rod magnet 326 is axially polarized and has a slide magnet north pole half 362 and a slide magnet south pole half 364.

The distance between the back slide magnet assembly end 354 and the slide rod magnet (i.e. the thickness of the back end portion 360 of the slide magnet assembly 324) is approximately equal to the translational displacement distance of the slide member 314 required to disengage the first and second metal shims 333/334 (shown in FIGS. 10A to 10C) from the first lid magnet 306 (shown in FIGS. 12A to 12C) and the second lid magnet (not shown).

FIG. 11B is a perspective view of the base magnet assembly 328. In this embodiment, the base magnet assembly 328 is generally rectangular block shaped and includes a base magnet assembly side groove 366, an opposite base magnet assembly side 368, a front base magnet assembly end 370, a back base magnet assembly end 372, a base magnet assembly top 374, and a base magnet assembly bottom 376. The base magnet assembly side groove 366 is a lengthwise recess shaped to receive the base rod magnet 330. The base magnet assembly side 368, the front base magnet assembly end 370, the back base magnet assembly end 372, the base magnet assembly top 374, and the base magnet assembly bottom 376 are all substantially flat, although embodiments are not so limited.

The base rod magnet 330 is cylindrically shaped positioned lengthwise in the base magnet assembly side groove 366. The base rod magnet 330 extends from the front base magnet assembly end 370 to the back base magnet assembly end 372. The base user interface support strip 332 runs lengthwise along the base magnet assembly top 374. The total height of the base magnet assembly 328, including the base user interface support strip 332 is the same as the thickness of the thickness of the inner piece 340 of the base member body 336 (shown in FIGS. 10A to 10C). The base rod magnet 330 is axially polarized and has a base magnet south pole half 378 and a base magnet north pole half 380.

In some embodiments, the bulk of the slide magnet assembly 324 (shown in FIG. 11A) and the base magnet assembly 328 (shown in FIG. 11B), excluding the slide rod magnet 326 and the base rod magnet 330 (also shown in FIGS. 11A and 11B respectively), may be made of a lubricated engineering material such as acetal, although embodiments are not so limited. A lubricated material may be used because the attraction force of the magnets pull the slide magnet assembly 324 and the base magnet assembly 328 together, and it may be desirable to keep friction between the slide magnet assembly 324 and the base magnet assembly 328 to a minimum to ensure slide member 314 and the lid member 303 slide easily.

Turning back to FIGS. 10A to 10C, the slide rod magnet 326 is the same length as the base rod magnet 330, although embodiments are not so limited. Therefore, the base magnet assembly 328 is shorter than the slide magnet assembly 324 by a distance equivalent to the thickness of the back end portion 360 of the slide magnet assembly 324.

The remainder of the description of the device 300 will be mostly limited to and/or focus on, the elements of the device 300 which differ from the embodiment shown in FIGS. 1 to 9C. Other details regarding the structure, assembly and/or interaction of the elements of the device 300 will be apparent from the description of the embodiment shown in FIGS. 1 to 9C, to the extent that the elements of that embodiment are equivalent to the present embodiment shown in FIGS. 10A to 12C.

The assembly of selected elements of the device 300 will now be described with reference to FIGS. 10A to 10C. The slide magnet assembly 324 is fixedly attached by any acceptable means of attachment (glue, solder, screws etc.) at the back slide magnet assembly end 354 to the front slide member end 337 and extends forwards away from the slide member 314. In some embodiments, the slide magnet assembly 324 may be integral to the slide member 314. The slide member 314 forms part of the linked device end 301 (as shown in FIGS. 10A and 10C). There is space between the slide magnet assembly 324 and the inner piece 340 of the base member body 336 when the slide member 314 is in a rest position similar to that of the embodiment shown in FIGS. 1 to 9C.

The base magnet assembly 328 is fixedly attached by any acceptable means of attachment (glue, solder, screws etc.) to the base member body 336 such that it is adjacent to the slide magnet assembly 324. In some embodiments, the base magnet assembly 328 may be integral to the base member body 336. The slide magnet assembly 324 and the base magnet assembly 328 are arranged so that the north pole half 362 of the slide rod magnet 326 is aligned with the south pole half 378 of the base rod magnet 330 when the slide member is in the rest position (as shown in FIGS. 10A and 10C). The south pole half 364 of the slide rod magnet 326 is similarly aligned with the north pole half 380 of the base rod magnet 330. This position of the slide member 314 and the slide magnet assembly 324 is at the rest position. The specific polarized arrangement of the slide rod magnet 326 and the base rod magnet 330 described above can be reversed and is only provided as an example.

The lid member 303 is not translationally displaced when the slide member 314 is in the rest position. Thus, the lid member 303 may be translationally displaced, in the forward direction with respect to the base member 338.

The north pole half 362 of the slide rod magnet 326 is attracted to the south pole half 378 of the base rod magnet 330 and vice versa. Similarly, the south pole half 364 of the slide rod magnet 326 is attracted to the north pole half 380 of the base rod magnet 330 and vice versa. The slide rod magnet 326 and the base rod magnet 330, as arranged, will produce a return force which biases the slide member 314 to return to the rest position shown in FIGS. 10A and 10C. Specifically, if the slide member 314 moves a small distance from the rest position, thereby misaligning the slide rod magnet 326 and the base rod magnet 330, the forces of attraction/repulsion between opposite poles biases the slide rod magnet 326 and the base rod magnet 330 to re-align. Thus, the slide rod magnet 326 and the base rod magnet 330 may be referred to as a return mechanism, which in this case, is a magnetic biasing mechanism. The slide rod magnet 326 and the base rod magnet 330 return mechanism may function as a bi-directional return mechanism. Specifically, the slide rod magnet 326 and the base rod magnet 330 returns the slide member 314 to the rest position if the slide member is moved either forwards or backwards from the rest position.

The user interface base cover 308 rests on the base user interface support strip 332 as well as the inner piece 340 of the base member body 336, the first base slide guide 320 and the second base slide guide 322, thereby forming the base member 338.

The first metal shim 333 and the second metal shim 334 are attached to the inner piece 340 of the base member body 336 in the first shim recess 344 and the second shim recess 346 respectively. The first metal shim 333 is positioned so that the first lid magnet 306 (shown in FIG. 12C) is aligned vertically with the first metal shim 333 at the front first metal shim end 382 when the slide member 314 is in the rest position and the device 300 is in the closed position shown in FIG. 10A. Similarly, the second metal shim 334 is positioned so that the second lid magnet (not shown) is aligned vertically with the second metal shim 334 at the front second metal shim end 386 when the slide member 314 is in the rest position and the device 300 is in the closed position shown in FIG. 10A.

The first lid magnet 306 and the first metal shim 333 form a pair of retaining mechanism elements which engage to produce an attractive force to hold the device 300 closed when the device 300 is in the closed position. The second lid magnet and the second metal shim 334 similarly form a pair of first and second retaining mechanism elements to provide an attractive force. Again, more or less pairs of retaining mechanisms such as aligned magnet and metal shim pairs may be used in some embodiments.

The lid member 303 is rotatably engaged to the slide member 314 by the hinge assemblies 310 in a manner similar to the embodiment shown in FIGS. 1 to 9C.

Figure 12A:
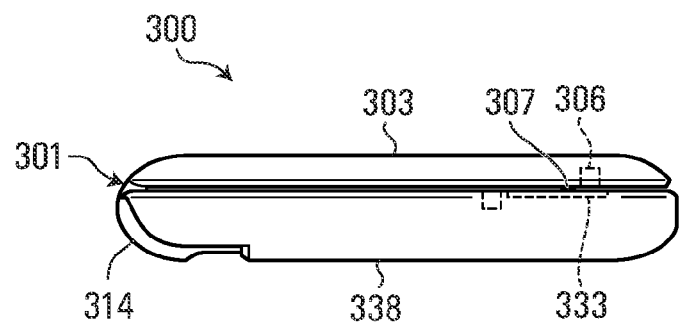
FIG. 12A is a side view of the mobile communication device of FIG. 10A in the closed position.
Figure 12B:
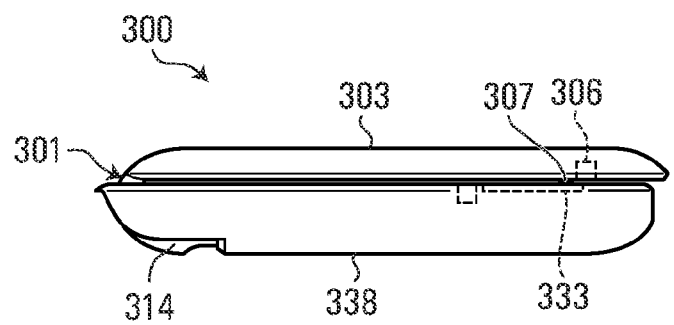
FIG. 12B is a side view of the mobile communication device of FIG. 10A in the displaced position.
Figure 12C:
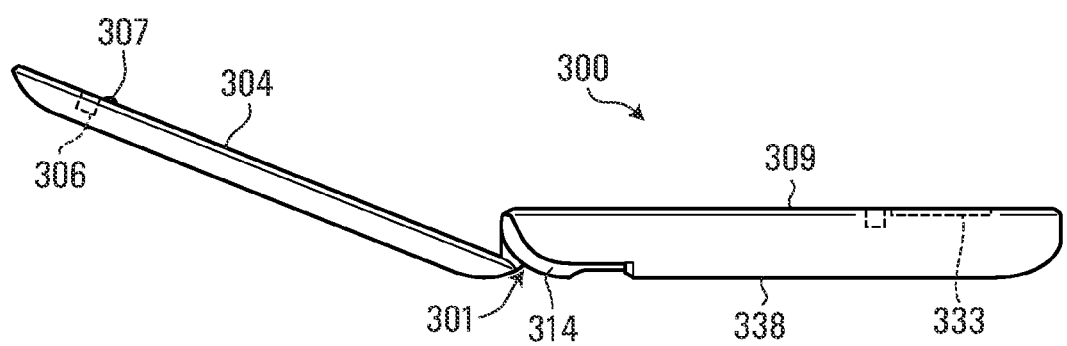
FIG. 12C is a side view of the mobile communication device of FIG. 10A in the opened position.

The interaction of the elements of the device 300 will now be described with reference to FIGS. 10A to 10C and 12A to 12C. FIGS. 12A to 12C are side views of the device 300 in the closed, displaced, and opened positions respectfully. The first lid magnet 306 and the first metal shim 333 are shown with dotted lines to indicate that they are hidden by the lid member 303 and the base member 338 respectively.

The hinge assemblies 310, the slide member 314, the first base slide guide 320, the second base slide guide 322, the slide magnet assembly 324 and the base slide magnet assembly 328 (which can collectively be referred to as a connecting mechanism) rotationally and translationally couple the lid member 303 and the base member 338. These elements enable both a sliding functionality and a rotatable hinge functionality. The slide member 314 is slidably connected to the base member 338 and rotatably connected to the lid member 303. The slide member 314 and the lid member 303 may slide with respect to the base member body 336. Thus, these elements allow forward displacement of the lid member 303 with respect to the base member 338. In addition, the lid member 303 may rotate with respect to the base member 338.

As with the embodiment described with respect to FIGS. 1 to 9C, the hinge assemblies 310 provide an opening torsion force to bias the lid member 303 to rotate away from the base member 338 toward the opened position unless a force is present to hold the device 300 closed.

Starting from the closed position shown in FIGS. 10A, and 12A the slide member 314 is in the rest position and the lid member 103 is not translationally displaced. As mentioned above, the slide member 314 naturally rests in this position due the return force provided by the slide rod magnet 326 and the base rod magnet 330 (shown in FIG. 10A). The lid member 303, which is rotatably coupled to the slide member 314 by means of the hinge assemblies 310 (shown in FIG. 10C), is aligned with and approximately adjacent to the base member 338.

As shown in FIG. 12A, the first lid magnet 306 and the first metal shim 333 are vertically aligned and almost adjacent. The second lid magnet (not shown) and the second metal shim 334 (shown in FIG. 10A) are similarly aligned and almost adjacent. The bumpers 307 of the lid member 303 (shown in FIGS. 12A to 12C) separate the inner lid member surface 304 (shown in FIG. 10C) from the interface surface 309 (shown in FIG. 12C). Thus, the first metal shim 333 and the second metal shim 334 are separated by a small gap from the first lid magnet 306 and second lid magnet. However, the attractive force provided is still sufficient to overcome the torsional opening force provided by the hinge assemblies 310 and the device may, therefore, remain closed without user interaction.

In order to open the device 300, a user of the device 300 may press in the forward direction on the linked device end 301 and/or the lid member 303 to translationally displace the lid member 303 in the forward direction. The user may thereby displace the slide member 314 and the lid member 303 to move the device to the displaced position shown in FIGS. 10B and 12B. The slide member 314 and lid member 303 move together because they are connected by the hinge assemblies 310 (shown in FIG. 10C). The forward movement of the slide member 314 is stopped by the interaction of the slide member 314 with the first base slide guide 320 and the second base slide guide 322 (both shown in FIG. 10B).

When a user pushes on or presses the linked device end 301 and/or the lid member 303, the first lid magnet (shown in FIG. 12C) and the second lid magnet (not shown) are driven forward relative to the first and second metal shim 333/334 (shown in FIG. 10B). In the displaced position, the first lid magnet (shown in FIG. 12C) and the second lid magnet and the respective first and second metal shim 333/334 are no longer vertically aligned. Thus, the attractive force holding the device 300 closed may be reduced or essentially absent. The torsional opening force provided by the hinge assemblies 310 is no longer overcome by the attractive force, and the lid member 303 will rotate away from the base member 338 and the free device end 302 toward the opened position. In this way, translationally displacing the lid member 303 in the forward direction initiates opening of the device 300. The user drives a slide action of the device 300 and the hinge assemblies 310 drive a flip action of the device 300.

In addition, when a user pushes on the linked device end 301 and/or the lid member 303, the slide rod magnet 326 is driven relative to the base rod magnet 330. Thus, the slide rod magnet 326 and the base rod magnet 330 are misaligned when the device is moved to the displaced position shown in FIGS. 10B and 12B. Therefore, the slide rod magnet 326 and the base rod magnet 330 will provide a return force when the device 300 is moved to the displaced position.

Once the lid member 303 has begun to rotate away from the base member 338, the user may cease applying force to the linked device end 301 and/or the lid member 303. Due to the return force provided by the slide rod magnet 326 and the base rod magnet 330, the slide member 314 and the lid member 303 will slide back to the rest position in which the lid member is not displaced. Specifically, the slide rod magnet 326 and the base rod magnet 330 will realign thereby moving the slide member 314 backward to the rest position. The device 300 will, therefore, move to the opened position shown in FIGS. 10C and 12C.

As can be seen in FIGS. 100 and 12C, when the device 300 is in the opened position, the slide member 314 is again in the rest position and the lid member 303 is no longer translationally displaced. The lid member 303 is rotated to an angle with respect to the base member 338 so that the graphical display (not shown) on the inner lid member surface 304 (shown in FIGS. 100 and 12C) and the keyboard (not shown) on the interface surface 309 of the user interface base cover base 308 (shown in FIG. 10C and 12C) member are accessible.

To close the device 300, the user may simply rotate the lid member 303 back to a position adjacent to the base member 338 so that the device 300 is in the closed position shown in FIGS. 10A and 12A. The first lid magnet 306 (shown in FIG. 12A) and the second lid magnet (not shown) will again be vertically aligned with, and almost adjacent to the first metal shim 333 and the second metal shim 334 respectively, thus re-engaging the attractive force to hold the device 300 in the closed position. As mentioned, embodiments are not limited to the closed and opened positions described above, and other closed and opened positions may be possible.

As with the embodiment shown in FIGS. 1 to 9C, the linked device end 301 and the lid member 303 of the device 300 essentially become a virtual push button for opening the device which can be activated by applying force to the linked device end 301. A user of the device 300 may be able to press on the linked device end 301 to open the device 300 without loosening or releasing their grip on the device 300, even if the device 300 is held with only one hand.

Again, it is to be understood that the embodiments described herein are only examples of possible embodiments. What has been described is merely illustrative of the application of the principles of the application. Other arrangements and methods can be implemented by those skilled in the art without departing from the spirit and scope of the application.

The invention claimed is:

1. A mobile communication device comprising:
   a first member comprising a first outer surface of the device;
   a second member comprising a second outer surface of the device;
   a linked end and a free end; and
   a connecting mechanism rotatably coupling the first member and the second member at the linked end of the device such that the first member and the second member are moveable between an opened position and a closed position, the first outer surface being opposite to the second outer surface when the device is in the closed position,
   the connecting mechanism translationally coupling the first member and the second member such that the first member and the connecting mechanism are translationally displaceable with respect to the second member in a direction toward the free end of the device, thereby initiating movement of the device from the closed position to the opened position,
   the linked end of the device comprising a contact area formed by at least one of the connecting mechanism and the first member, the contact area extending from the first outer surface to the second outer surface of the device, wherein
   pressing on the contact area in the direction toward the free end of the device translationally displaces the connecting mechanism and the first member relative to the second member.

2. The device of claim 1, wherein the connecting mechanism is rotatably engaged to the first member to enable said movement between the opened position and the closed position, and
   the connecting mechanism is slidably engaged to the second member to enable said translational displacement of the first member.

3. The device of claim 1, further comprising at least one retaining mechanism operable to hold the device in the closed position when the at least one retaining mechanism is engaged.

4. The device of claim 3, wherein said translational displacement of the first member disengages the at least one retaining mechanism.

5. The device of claim 3, wherein the connecting mechanism biases the device toward the opened position with a bias sufficient to open the device when the at least one retaining mechanism is disengaged and insufficient to open the device when the at least one retaining mechanism is engaged.

6. The device of claim 1, further comprising a return mechanism which biases the first member of the device to remain translationally un-displaced with respect to the second member.

7. The device of claim 6, wherein the return mechanism comprises a mechanical biasing mechanism.

8. The device of claim 7, wherein the mechanical biasing mechanism comprises at least one spring.

9. The device of claim 6, wherein the return mechanism comprises a magnetic biasing mechanism.

10. The device of claim 9, wherein the magnetic biasing mechanism comprises a first axially polarized magnet and a second axially polarized magnet adjacent to the first magnet, magnetic poles of the first magnet being aligned to opposite magnetic poles of the second magnet when the device is in the closed position, and wherein said translational displacement of the first member misaligns the magnetic poles of the first magnet and the second magnet.

11. The device of claim 10, wherein the first magnet is attached to the connecting mechanism and the second magnet is attached to the second member.

12. The device of claim 3, wherein each at least one retaining mechanism comprises a pair of retaining elements, the pair of retaining elements engaging each other when the device is in the closed position and the first member is not translationally displaced, and not engaging each other when the first member is translationally displaced.

13. The device of claim 12, wherein the pair of retaining elements comprises at least one magnetic element.

14. The device of claim 12, wherein one of the pair of retaining elements comprises an axially polarized magnet attached to the first member, and
    the other of the pair of retaining elements comprises one of an axially polarized magnet and a metal shim attached to the second member.

15. A connecting mechanism for coupling a first member of a mobile communication device to a second member of the device at a linked end of the device, the first member comprising a first outer surface of the device, the second member comprising a second outer surface of the device, the connecting mechanism comprising:
    a slide member operable to slidably engage the second member of the device such that the first member and the connecting mechanism are translationally displaceable with respect to the second member in a direction toward a free end of the device; and
    a rotatable hinge operable to rotatably couple the first member to the slide member such that:
       the first outer surface is opposite to the second outer surface when the device is in a closed position; and
       the linked end of the device comprises a contact area formed by at least one of the connecting mechanism and the first member, the contact area extending from the first outer surface to the second outer surface of the device, wherein
    pressing on the contact area in the direction toward the free end of the device translationally displaces the connecting mechanism and the first member relative to the second member.

16. The connecting mechanism of claim 15, further comprising a return mechanism which biases the first member to remain translationally un-displaced.

17. The connecting mechanism of claim 16, wherein the return mechanism comprises at least one of a mechanical biasing mechanism and a magnetic biasing mechanism.

18. The connecting mechanism of claim 15, wherein the connecting mechanism biases the device toward an opened position.

19. A method for coupling a first member of a mobile communication device to a second member of the device at a linked end of the device, the first member comprising a first outer surface of the device, the second member comprising a second outer surface of the device, the first outer surface being opposite to the second outer surface when the device is in a closed position, the method comprising:
  rotatably connecting the connecting mechanism to the first member of the device at the linked end of the device such that the linked end of the device comprises a contact area formed by at least one of the connecting mechanism and the first member, the contact area extending from the first outer surface to the second outer surface of the device;
  slidably connecting the connecting mechanism to the second member of the device such that the first member is translationally displaceable with respect to the second member in a direction toward a free end of the device, and such that pressing on the contact area in the direction toward a free end of the device translationally displaces the connecting mechanism and the first member relative to the second member; and
  releasably engaging the first and the second member with at least one retaining mechanism when the device is in a closed position, wherein
  displacing the first member disengages the retaining mechanism thereby initiating movement of the device to an opened position.

20. The method of claim 19, further comprising biasing the device toward the opened position with a bias sufficient to open the device when the at least one retaining mechanism is disengaged and insufficient to open the device when the at least one retaining mechanism is engaged.

* * * * *